Sept. 13, 1932.                A. M. TROGNER                1,877,371
                                 THERMOSTAT
                              Filed Jan. 25, 1929
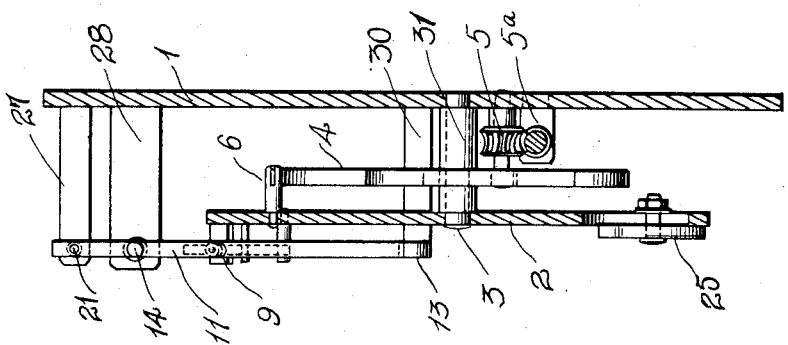
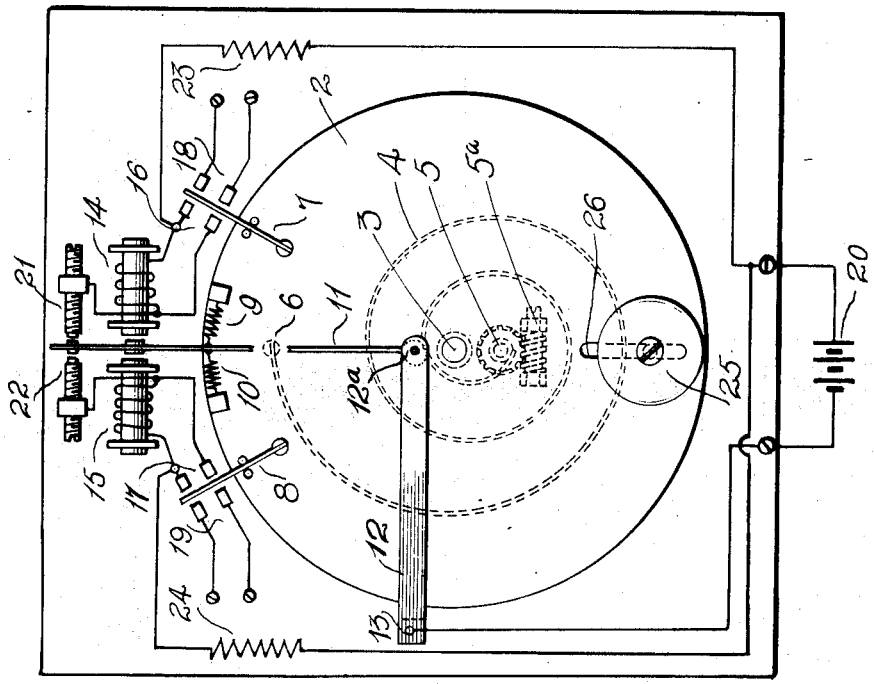
Inventor:
Arthur M. Trogner
by Harold Dodd
Atty.

Patented Sept. 13, 1932

1,877,371

UNITED STATES PATENT OFFICE

ARTHUR M. TROGNER, OF EAST ORANGE, NEW JERSEY, ASSIGNOR TO WIRED RADIO, INC., OF NEW YORK, N. Y., A CORPORATION OF DELAWARE

THERMOSTAT

Application filed January 25, 1929. Serial No. 335,109.

My invention relates to thermostats of the type employing a bimetallic and thermoexpansive element.

An object of my invention is to provide a thermostat the operation of which is substantially unaffected by mechanical vibrations.

Another object of my invention is to provide a thermostat wherein certain structural features protect the thermoexpansive mechanism and indicating mechanism from external shocks and mechanical vibration.

Still another object of my invention is to provide a thermostat wherein the thermoexpansive mechanism and indicating mechanism is balanced.

Other and further objects of my invention reside in the structural features of my invention, a better understanding of which can be had by referring to the specification following and to the accompanying drawing wherein: Figure 1 is a front elevation showing my improved thermostat; and Fig. 2 is a side view of the thermostat embodying my invention.

The principle of the bimetallic, thermoexpansive thermostat is well known to those skilled in the art. Dissimilar metals, usually those having widely different coefficients of expansion, are positioned adjacent to each other. The metals may be iron and brass and the unit comprising strips of such metals bolted, riveted or otherwise fastened together at their extreme ends. Changes in the temperature to which the unit is subjected cause the metals to expand. Since the coefficient of expansion of the different metals differs materially it is obvious that the expansion per unit increase in temperature of the one is not the same as the expansion of the other. Such units are employed in many different applications including electrical switches whereby changes in the temperature to which the unit is subjected controls electrical circuits associated with electrical apparatus such as motors, heaters and incandescent lamps. It is often desirous to employ thermostats in combination with certain machines and mechanical apparatus such as type making machines employed in printing enterprises, molding and stamping machinery, automobile and marine engines and in many other combinations. The thermostat generally employed is unsuitable for such application due to the mechanical vibration which makes accurate calibration and positive indication almost impossible. The thermostat of my invention avoids the foregoing disadvantages of other types and provides an accurate and reliable thermostat applicable to a variety of uses to which ordinary types of thermostats are unsuited.

Fig. 1 is a diagrammatic representation showing the thermostat of my invention. The thermostat in its entirety is mounted on a base 1 which may be of metal, wood or other material depending upon the application. To this base is pivoted a disk 2 by means of a suitable bearing 3. A bimetallic thermoexpansive member 4, comprising different metals having different coefficients of expansion is carried by disk 2 at 6 and is anchored on base 1 through the gear and pinion 5. Gear and pinion 5 is adjustable by means of adjustment 5a. Since one end of bimetallic member 4 is connected to disk 2 and the other end connected to base 1, changes in the temperature of member 4 cause disk 2 to move in respect to base 1 in either a clockwise or counterclockwise direction depending upon whether the change in temperature is a decrease or an increase. An armature 11 is pivoted by a suitable bearing 12a and is associated with disk 2 by means of springs 9 and 10. Movements of disk 2 in either a clockwise or counterclockwise direction causes armature 11 to move to either the right or left of the neutral position. Excessive movement of disk 2 causes no damage to armature 11 when the movement of the latter is restricted. Electromagnets 14 and 15 are electromagnetically associated with armature 11 and are positioned in such a manner as to obstruct the movement of armature 11 when the latter is actuated by the movement of disk 2. Contact members, associated with armature 11, are adapted to make electrical contact with opposed contact members 21 and 22 when disk 2 rotates in either a clockwise or counterclockwise direction. The contact members associated with armature 11 are electrically connected to source of electrical energy 20.

Contact members 21 and 22 are electrically connected to electromagnets 14 and 15 respectively. Electromagnets 14 and 15 have a common connection to source 20 through load circuits 23 and 24 respectively. Load circuits 23 and 24 may comprise heater units or other electrical apparatus to be controlled by thermostatic operation. Contact members 7 and 8 are carried by disk 2 and movable therewith. Contact members 16 and 17 are adapted to shortcircuit electromagnets 14 and 15 when contacted by members 7 and 8 respectively. Auxiliary load circuits may be controlled by associating the same with contact members 18 and 19. Electromagnet 14 is energized from source 20 when the movement of armature 11 is sufficient to establish an electrical connection between contact member 21 and the contact member associated with the armature. The energization of electromagnet 14 exerts a magnetic attraction for armature 11 and prevents the interruption of the circuit 23 due to small mechanical vibrations exerted upon the armature extraneous to the thermostat itself. Similarly, electromagnet 15 is energized from source 20 when and only when the movement of armature 11 in this direction is sufficient to establish an electrical connection between contact 22 and the contact associated with armature 11. Sufficient movement of disk 2 in a clockwise direction causes contact members 17 to be shunted by contacting member 8. Contacting member 8 being connected in parallel with electromagnet 15 causes electromagnet 15 to be short circuited and the magnetic attraction exerted upon armature 11 removed. This in turn allows armature 11 to move toward electromagnet 14 due to the movement of disk 2 and the resilient properties of spring 9.

An electrical connection is established between contact member 21 and the contact member associated with armature 11 whereby electromagnet 14 is energized from source 20. The energization of electromagnet 14 causes armature 11 to be held in this position until disk 2 reverses its direction of movement and contact members 16 are shunted by contact member 7. A counter balance 25 is provided which is adjustably positioned diametrically opposite the projecting end of bimetallic member 4 on disk 2. Counter balance 25 compensates the unbalanced condition of disk 2 and introduces sufficient inertia to prevent vibrational movement of disk 2 caused by bimetallic member 4 and contact members 7 and 8 which are positioned on the disk.

Fig. 2 shows a side elevation and partially cross-sectional view of the thermostat of my invention. Reference characters employed in Fig. 2 correspond to those shown in Fig. 1. The end of electromagnet 14 is supported by member 28. Contact 21 is likewise carried by base 1 by means of support 27. Armature 11 is pivoted on base 1 by members 13 and 30. Disk 2 is pivoted on base 1 by members 3 and 31. Bimetallic, thermoexpansive member 4 is positioned on disk 2 by a suitable supporting lug 6. Supporting and pivoting members 13—30 for supporting armature 11, are external to disk 2. Supporting member 3, for supporting disk 2 is encircled by bimetallic member 4. The innermost end of the spiral comprising bimetallic member 4 is connected to gear 5, the latter of which is adjustable by adjusting member 5a. Balancing member 25 comprising a suitable weight is adjustably positioned on disk 2 and is movable toward or away from the axis of the disk.

Many modifications of the thermostat of my invention are possible without departing from the spirit of my invention. The thermostat of my invention finds ready application to radio installations in aeronautical and nautical engineering. In radio transmitting systems employed on vessels at sea it is difficult to maintain accurate adjustments due to the violent mechanical shocks and vibration which is frequently experienced. In thermionic tube transmitting systems employing a mechanically vibratile element such as quartz having piezo electric properties it is essential to efficiency that the temperature of the element remain substantially constant. The thermostat of my invention may be designed to be very compact and with heaters 23 and 24, as shown in Fig. 1, the temperature of the element may be maintained within certain predetermined values. The thermostat of my invention may be employed in many different combinations and embodying certain modifications not shown in the accompanying drawing and it is to be understood that the embodiments of my invention are not to be limited to the foregoing specification or to the accompanying drawing but only as defined in the appended claims.

What I claim as new and desire to secure by Letters Patent of the United States is as follows:

1. A thermostat comprising in combination a support, an angularly movable disc member, a bimetallic thermoexpansive element connected at one end with said support and at the other end with said angularly movable disc member, and a counterbalancing weight carried by said disc, magnetic means disposed adjacent said disc member for retaining said element in predetermined position and an electrical contact system controlled by said element.

2. A thermostat comprising in combination a support, an angularly movable disc, a bimetallic member consisting of two dissimilar metals connected at one end to said support and at the other end to said disc, a counterbalancing weight carried by said disk whereby the position of said disc is shifted in accordance with the change in position of said element and changes in the temperature to which said element is subjected and magnetic means adjacent said disc and associated with said element whereby said element is retained in said changed position.

3. A thermostat comprising a movable member, a bimetallic thermoexpansive member connected thereto, a counterbalancing weight adjustably positioned on said member and magnetic means for holding said last mentioned member in a given position resulting from changes in the temperature of said thermoexpansive member, sets of contacts carried by said movable member, and fixed contacts aligned therewith and adapted to be closed when said first mentioned member is shifted in position.

5. A thermostat comprising in combination a plate member, a bimetallic member thermally responsive to changes in temperature and connected to impart movement to said plate member, a counterbalancing weight adjustable radially of said plate member and magnetic means for retaining said plate member in positions occupied by said bimetallic member when actuated by plate changes in temperature.

6. A thermostat comprising a contact carrying member angularly rockable to either of two limiting positions, a bimetallic member connected to said first mentioned member, a counterbalancing weight adjustably positioned on said member and magnetic means for retaining said first mentioned member in either limiting position caused by the thermoexpansion of said bimetallic member responsive to changes in temperature.

7. A thermostat comprising in combination a contact carrying angularly rockable disc member, a thermally expansive member fixed at one end and connected to said disc member at the other end, said contact carrying angularly rockable disc member being adapted to complete an electrical circuit when said thermally expansive member is subjected to changes of temperature, a counterbalancing weight adjustably mounted on said disc member and magnetic means associated with said first mentioned member and adapted to hold said first mentioned member in the position to which it is shifted by said thermally expansive member to complete said electrical circuit.

8. A thermostat comprising in combination a rotatable plate member carrying contacts thereon, a central pivot for said member, a bimetallic thermoexpansive member spirally mounted around said central pivot and connected at one end with a fixed support and at the other end with said plate member, the contacts on said member being adapted to control an electrical circuit, a counterbalancing weight adjustably mounted on said plate member and magnetic means for exerting a retaining force upon said thermostatic member.

9. In a thermostat comprising a movable contact device, a spirally mounted bimetallic thermoexpansive member disposed adjacent said device, an armature, resilient connections between said armature and said contact device, and a counterbalancing weight adjustably positioned on said movable contact device, magnetic means adapted to retain said armature and thermoexpansive member in either of the limiting positions thereof responsive to changes in temperature.

10. In a thermostat a spiral thermoexpansive member, a contact system controlled thereby and shiftable to either of two positions, a counterbalancing weight carried by said contact system, magnetic means for exerting a retention force upon the thermoexpansive member and means for adjusting the tension on said spiral thermoexpansive member.

11. In a thermostat the combination of a thermoexpansive member, means for adjusting the tension thereon, a contact system controlled by said member, and a shiftable weight carried by said moving contact system, electromagnetic means for exerting a retention force upon said member in either of two limiting positions thereof.

12. A thermostat comprising in combination a rockable plate member carrying contacts thereon, a bimetallic member spirally mounted with respect to said plate member and adapted to control electrical circuits in response to variations in the temperature to which said bimetallic member is subjected, a radially adjustable counterbalancing weight carried by said rockable plate member and electromagnetic means for exerting a resisting force to the thermoexpansive action of said member and maintaining said rockable plate member in a predetermined position.

13. A thermostat comprising in combination an armature, contact members associated with said armature, a counter balance associated with said armature, contact members adjacent to said armature adapted to control the energization of electromagnets placed adjacent to said armature and a bimetallic member for actuating said armature.

14. A thermostat comprising in combination an armature adapted to be actuated by the thermoexpansion of a bimetallic member, said armature being associated with contact members and a counter balance, and fixed contact members adjacent to said first mentioned contact members and associated with electromagnets adapted to exert a retaining force upon said armature.

15. A thermostat comprising in combination an armature adapted to be actuated by the thermoexpansion of a bimetallic member, said armature being associated with contact members and a counter balance, a bimetallic member associated with said armature, contact members adjacent to said first mentioned contact members and the latter associated with electromagnets adapted to exert a retaining force upon said armature.

16. A thermostat comprising in combination an armature adapted to be actuated by the thermoexpansion of a bimetallic member, said armature being associated with contact members and a counter balance, a bimetallic member associated with said armature, contact members adjacent to said first mentioned contact members and the latter being adapted to control the energization of holding magnets associated with said armature.

17. A thermostat comprising in combination an armature adapted to be actuated by the thermoexpansion of a bimetallic member, said armature being associated with contact members and a counter balance, a bimetallic member associated with said armature, contact members adjacent to said first mentioned contact members, the latter being adapted to control the energization of holding magnets associated with said armature, and auxiliary contact members associated with said armature for controlling electrical circuits external to said thermostat.

18. A thermostat system comprising a centrally pivoted disc, a contact device carried by said disc on each side of the center thereof, an armature member, electromagnetic means for maintaining said armature member in either of two limiting positions, resilient connections between said armature and said disc, a thermoexpansive element fixed at one end and connected with said disc at the other end for shifting said disc to either of two limiting positions according to the temperature conditions adjacent said thermoexpansive element, and circuits interconnecting the contact device on each side of said disc and said electromagnetic means for positively locking said disc in either of the limiting positions thereof depending upon the movement of said disc under control of said thermoexpansive element.

ARTHUR M. TROGNER.